Dec. 8, 1964  M. A. ELLIOTT  3,159,995
PNEUMATICALLY GENERATED HYDROSTATIC PRESSURE SIMULATION
Filed June 30, 1955
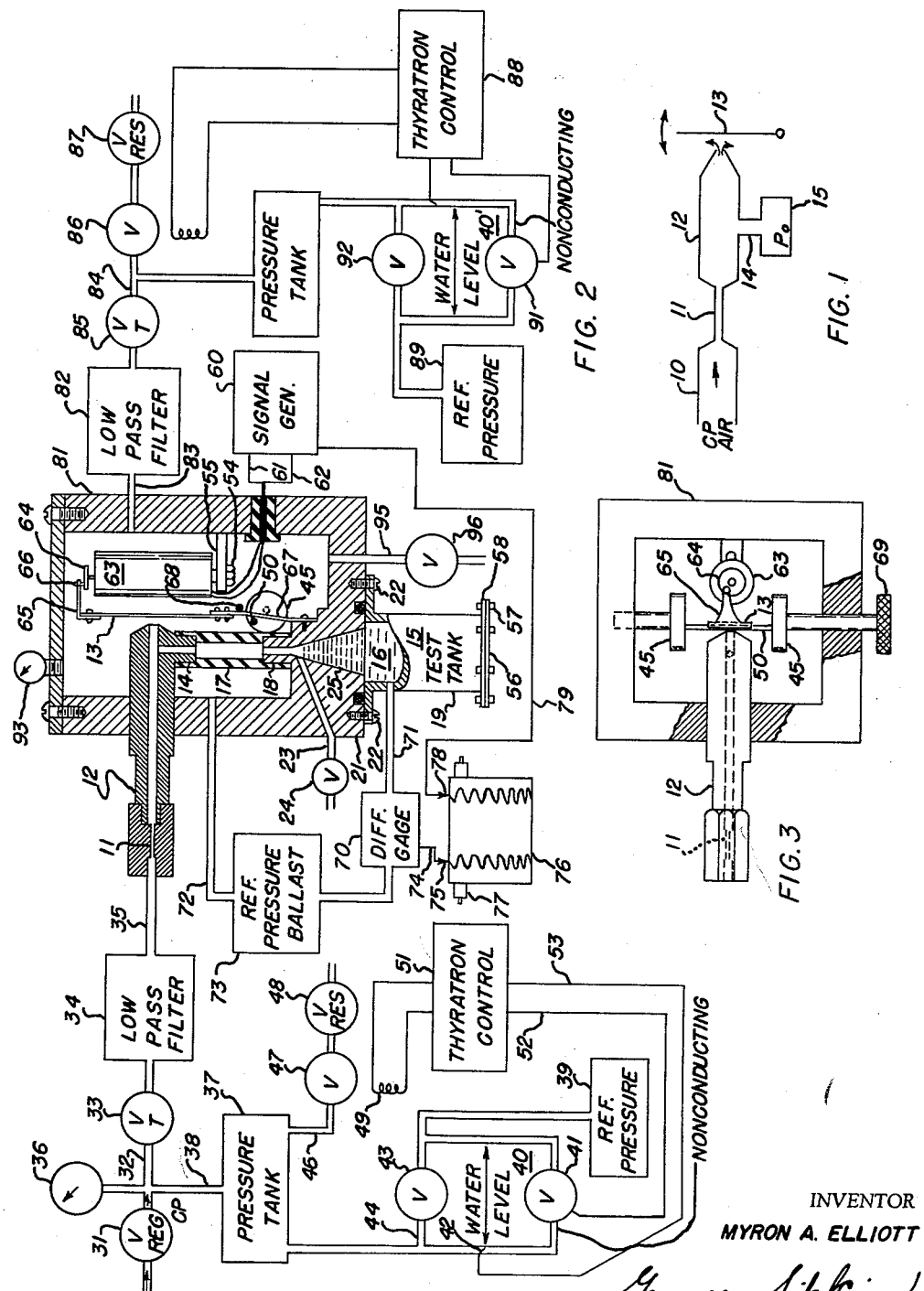
INVENTOR
MYRON A. ELLIOTT
BY
ATTORNEYS

3,159,995
PNEUMATICALLY GENERATED HYDROSTATIC PRESSURE SIMULATION
Myron A. Elliott, Lynn Haven, Fla., assignor to the United States of America as represented by the Secretary of the Navy
Filed June 30, 1955, Ser. No. 519,298
7 Claims. (Cl. 73—4)
(Granted under Title 35, U.S. Code (1952), sec. 266)

The invention described herein may be manufactured and used by or for the Government of the United States of America for governmental purposes without the payment of any royalties thereon or therefor.

The present invention relates to the generation of pressure changes and more particularly to a method and apparatus for producing under controlled conditions pressure changes simulating those encountered on the ocean floor due to swells, waves, ships passing overhead, and the like. Extended use of pressure operated mechanisms such as low frequency hydrophones, mine mechanisms, swell recorders and various other pressure field responsive devices requires a knowledge of their operating characteristics and the development of these devices would be difficult and expensive if they had to be tested under natural conditions and the concomitant abundance of uncontrollable variables.

The primary desideratum for simulating the operating conditions encountered by the various pressure sensitive devices indicated above is the ability to produce pressure variations of say from 0.01 to 50 cycles per second with amplitudes up to 90 inches of water and under ambient pressure up to 150 feet of water, the required pressure variations being specified by a recording, graph, or equivalent representation. Heretofore the production of small pressure changes under hydrostatic heads in a closed tank has usually involved some form of piston being worked into the tank by an electrical or mechanical drive. Any such piston is relatively massive, so that its speed of response is slow and it requires an operating force which increases with any increase in the total pressure in the tank. These factors and the friction necessarily present make it very difficult to devise a piston drive which will faithfully follow an electric signal representing the desired pressure variations.

It is an object of the invention to provide a method and apparatus for generating in a fluid pressure variations simulating pressure variations produced in a body of water by the passage of a ship, waves, swells, and the like.

Another object of the invention is to provide a pressure simulating device operative to produce pressure variations in strict accordance with variations in an electric signal.

Still another object of the invention is to reproduce in a liquid pressure variations previously recorded under selected conditions.

Other objects and advantages of the invention will become apparent from the following description of a preferred embodiment of the invention when read in connection with the accompanying drawing, in which:

FIG. 1 shows diagrammatically a nozzle-flapper type pneumatic amplifier employed in the preferred embodiment of the invention;

FIG. 2 is a conventionalized schematic showing partly in section of the preferred embodiment of the invention; and FIG. 3 is a partial top view showing the arrangement employed for driving the flapper valve.

In accordance with the invention a control voltage (or current) derived by sensing a recording, graph, or the like, and which will provide a pressure representing signal is employed to adjust the flapper valve in a nozzle-flapper pneumatic amplifier in such a manner that the back pressure in the nozzle varies in strict accordance with the variations represented by the control signal. These variations in back pressure are transmitted to a liquid in a test tank through a small volume of gas confined over the free surface of the liquid.

In the preferred embodiment of the invention to be disclosed herein, a nozzle-flapper amplifier of the type discussed in "Instruments," Volume 26, Number 7, July 1953, on pages 1026–33, and as shown schematically in FIG. 1, is employed for producing the pressure variations. As indicated in FIG. 1, a suitable gas such as air under constant pressure in a conduit 10 is passed downstream serially through an isolating restriction 11, a nozzle 12, and a variable restriction comprised of the mouthpiece or jet of the nozzle 12 and a vane 13 movable toward and away from the mouthpiece. The air jet and flapper-vane 13 constitute a low pneumatic resistance, the magnitude of which depends upon the separation between the mouthpiece of the nozzle 12 and the flapper-vane 13, the greater this resistance, the greater the back pressure induced in the nozzle 12. This back pressure produced upstream from the jet is a function of the position of the flapper-vane 13, but as will be discussed below, this is not a linear function and small changes in the position of the flapper-vane 13 cause relatively large changes in the pressure in the nozzle 12, which pressure changes are taken off through a conduit 14 to a test tank 15. The back pressure in this tank 15 is labeled $P_0$.

Referring now to FIG. 2, which is a schematic showing of a complete operative system for practicing the invention, the nozzle 12 has its pressure take-off tube 14 connected to a volume of gas confined over the free surface of a liquid 16 such as water by a stiff rubber hose 17 and the neck portion 18 of the test tank 15. As here shown the test tank 15 comprises a separable part 19 which is detachably secured to a plate 21, as by bolts 22, provided with an inverted cone shaped cavity 25 terminating at its top in the neck portion 18 above referred to. In order that the free surface of the liquid 16 may always initially occupy the same level, an overflow tube 23 having a valve 24 is provided to connect the mouthpiece 18 to waste. The valve 24 is, of course, in closed condition throughout the time the apparatus is in use, and is opened only for the purpose of filling the test tank 15. The volume of air confined over the free surface of the liquid 16 is the load volume and is preferably kept small, i.e., of the order of 10 cc., so that the time constant is small and the speed of response is fast enough to follow the pressure variations which are to be simulated. If desired, a damping effect in the load volume comprised of the air confined over the surface of the liquid 16 may be introduced by reducing the cross section of the rubber hose 17 at one or more points along its length.

It is here noted that the employment of the rubber hose 17 for connecting the take-off tube 14 with the neck 18 is for structural convenience only in that it is flexible enough to permit longitudinal movement of the nozzle 12 so that it may initially be adjusted to the proper distance from the flapper-vane 13. Once this location is determined to be optimum, the apparatus is functionally indifferent to the type of material employed for confining the gas over the free liquid surface, as long as it is rigid enough to maintain constant the volume of gas so confined.

Air under pressure from any suitable source is fed through a constant pressure outlet valve 31, a conduit 32, a throttle valve 33, a ballast tank 34 which functions as a low-pass filter, and a pipe 35 to the isolating restriction 11 constituting the inlet to the nozzle 12. If desired, a suitable gauge 36 may be provided in communication with the conduit 32 for indicating the pressure. To assure the required constant supply of air to the nozzle 12, an air pressure regulator including a water-operated switch is connected to the air path between the regulating valve 31 and the low-pass filter 34. This regulator comprises a pressure tank 37 in communication with the conduit 32 through a pipe 38 and with a pressure reference tank 39 through a water switch U-tube 40 having a damping valve 41 at its bottom and having one of its arms made of nonconducting material, preferably glass, and provided with an electrode 42. A normally closed cut-off valve 43 in a pipe 44 connecting the two legs of the U-tube 40 makes it possible to provide a communicating channel between between the pressure tank 37 and the pressure reference tank 39 which bypasses the U-tube 40 of the water switch.

The reference pressure in the tank 39 for the water switch in the U-tube 40 is established by closing the damping valve 41 and opening the cut-off valve 43 and letting the pressure build up from the supply through valve 31 until the backing pressure in the tank 39 reaches the desired value as indicated for example by the gauge 36. The cut-off valve 43 is then closed to isolate the backing volume or reference pressure in the tank 39 from the air source. The damping valve 41 is then opened a little to subject the liquid in the water switch U-tube 40 to the reference pressure in one leg and in the other leg to the pressure in the system supplying the nozzle 12. The gas in the pressure tank 37 can be vented to the atmosphere through a pipe 46, a solenoid-operated valve 47 and a restrictive valve 48. The solenoid 49 for operating the valve 47 is connected to be energized through a thyratron control 51 whenever the circuit between leads 52 and 53 is open and to de-energize the solenoid 49 to close the valve 47 whenever the circuit through the leads 52 and 53 is closed through the water path between the water valve 41 and the electrode 42, the lead 52 being connected to the valve 41 or other conducting part in contact with the water near the bottom of the U-tube 40 and the lead 53 being connected to the electrode 42.

The pressure in the supply line 32 is regulated to be slightly in excess of the reference pressure in the tank 39 so that whenever the valve 47 is closed by reason of the water being in contact with the electrode 42, the pressure in the supply system builds up and lowers the water level against the reference pressure until the circuit through the leads 52 and 53 is broken at which time the control system 51 energizes the solenoid 49 to open the valve 47, which permits an escape of air through the resistive valve 48 thereby lowering the pressure in the supply line 32, which in turn permits the water level to rise into contact with the electrode 42 and the regulating cycle is repeated. It is thus evident that the air pressure regulator is essentially an error feedback system, the error in the pressure being corrected by the action of the magnetic valve 47. Small oscillations are set up in the system by the action of the magnetic valve 47, but these are effectively damped out by the filtering action of the pressure tank 37, the low-pass filter 34 and the adjustable valve coupling 33. Also the resistive valve 48 is merely cracked open to prevent large surges of air when the valve 47 is opened.

A signal generator 60 is adapted to provide in any suitable manner, as from graphs, recordings or the like, an output on leads 61 and 62 representative of the pressure variations it is desired to simulate in the liquid 16. This signal output on the leads 61 and 62 is converted into ocillatory movement of the flapper-vane 13 in any suitable manner, here shown as comprising an oscillograph pen motor 63 (high torque galvanometer) provided with a drive wheel 64, which is eccentrically coupled to the flapper-vane 13 by a link 65 and a pin 66 mounted near the circumference of the pen motor drive wheel 64, the arrangement being such that the oscillations of the drive wheel 64 are converted to movement of the flapper-vane 13 toward and away from the jet opening of the nozzle 12.

The flapper-vane 13 is mounted in any suitable manner to permit it to be moved by the pen motor 63 toward and away from the jet of the nozzle 12. A mounting arrangement providing for some adjustment is shown in FIGS. 2 and 3 where the vane 13 is mounted on a Phosphor bronze spring 67 and is hinged by contact with a stationary bar 68 (shown only in FIG. 2). The tension on the spring 67 can be varied by rotating a knob 69 which rotates discs 45 and a bar 50 whose eccentric mounting on the discs 45 forces it to move toward or away from the spring 67 as desired.

The linearity of the simulator is, of course, dependent upon the characteristics of the electronic and mechanical components. The signal generator 60 is constructed to have linear operating characteristics so that an accurate reproduction of the input signal is obtained as far as angular displacement of the pen motor drive wheel 64 is concerned. However, equal angular displacements of the pen motor 63 do not result in equal linear displacements of the flapper-vane 13 wtih respect to the jet of the nozzle 12. Consequently some form of compensation must be used to produce linear pressure variations, preferably without deliberately distorting the input signal to the pen motor 63. Because for a given displacement of the flapper-vane 13 the pressure variation produced decreases in amplitude with an increase in the distance of the mean position of the vane 13 from the jet, it has been found possible to obtain a very close approach to overall linearity by judicious selection of: distance of separation of the jet and the flapper-vane 13, zero position of the pen motor and the tension in the spring 67.

In an apparatus which has operated satisfactorily the nozzle 12 is adjusted so that its jet end is approximately 1/32 inch from the flapper-vane 13. After the position of the jet is thus chosen, variations in the position of the flapper-vane 13 remains as the controlling factor for the pressure at the take-off 14. The starting position of the flapper-vane 13 may be adjusted by loosening the nut 54 which secures the pen motor 63 to a supporting bracket 55 and bodily rotating the pen motor to bring the eccentric pin 66 on the drive wheel 64 to the angular position best adapted for compensating for the lack of linearity in pressure variations and the movement of the flapper-vane 13. The zero of the pen motor 63 indicated in FIG. 3 has been found to give approximately the desired compensation. By inspection of FIG. 3 it will be evident that the closer the vane 13 approaches the jet the greater the angle of movement of the wheel 64 is required to move the vane 13 a unit distance.

It is generally desirable to monitor the pressure variations occurring in the liquid 16 so that the operator will know when the equipment is functioning as desired. For this purpose a differential guage 70 may be exposed to the pressure in the liquid 16 through a pipe 71 and to the ambient pressure against which the outlet of the nozzle 12 is operated through a conduit 72, which preferably includes a reference pressure ballast tank 73. The pressure changes experienced by the differential gauge 70 appear as an electrical output on a lead 74, which actuates a recording head 75 to impress them on a suitable recording medium 76 passed over a roller 77 in any well known manner. Simultaneously with the recording of the pressure changes in the liquid 16 and preferably on the same record sheet 76, a trace is recorded by a recording head 78 energized through a lead 79 by the signal generator 60, with the same wave form as that supplied to pen motor 63. The recordings on the sheet 76 thus provide a visual indication as well as a permanent record of what pressures were intended to be simulated, and the pressures actually produced.

The device or devices which are to be subjected to pressure variations for test or other purposes may be placed actually or effectively in the test tank 15 which tank may be provided with a manifold or other suitable access means here shown as a removable bottom plate 56 suitably secured as by bolts 57 to a flange 58 provided on the bottom end of the test tank 15. In testing large devices such as the sensitive end of a pressure mine or the like, the plate 56 may be removed and the face of the mine secured directly to the flange 58 in pressure tight relation. Once the device has been suitably arranged to be subjected to the pressure variations in the tank 15 and the tank has been filled with liquid 16 to the level determined by the overflow tube 23, the desired signals are produced by the generator 60 and the operating characteristics of the device being tested can be ascertained by noting the response or actuation of the device in correlation with the pressure variations as indicated by the record 76. It will be obvious to those skilled in this art that by suitably selecting the pressure variations to be produced that much useful information can be obtained through an analysis of the curves on the record 76 and the response or other reaction of the device under test. For instance, with the sensitive mechanism of a pressure mine exposed to the pressures in the test tank, the signal generator 60 can be caused to simulate the pressure signature of a ship as viewed from points on the bottom which subtend different angles with respect to the course of the ship and its apparent declination and the mine mechanism checked as to whether or not it fired.

In order to test devices under their expected operating conditions, such as deep under water, it is necessary to provide corresponding ambient pressures into which the nozzle 12 exhausts. For this purpose a pressure regulator substantially the same as the one above described for governing the pressure of the supply to the nozzle 12 is employed. The flapper-vane mechanism is enclosed in a gas-tight chamber 81 to which the regulator has access through a low-pass filter 82 and a pipe 83. Air from the low-pass filter 82 passes through a duct 84 containing a throttle valve 85, a solenoid operated valve 86, and a resistive valve 87. Here again the U-tube 40' of the water switch functions to close and open the circuit to a thyratron control 88 for actuating the valve 86 in accordance with differences in pressure between that in a reference pressure tank 89 and the exhaust line 84. Because the air flow from the nozzle 12 is considerably greater than the air flow through the exhaust line 84, an additional outlet is desirable for permitting excess air to leak out of the housing 81. As here shown such a leakage system may comprise a pipe 95 provided with a resistive valve 96.

For simulating pressure variations at ambient pressures corresponding to hydrostatic pressure at any given depth a damping valve 91 in the U-tube 40' is closed and its bypass valve 92 is open to permit the pressure within the casing 81 and the reference pressure tank 89 to rise to the pre-selected pressure such as fifty feet of water as indicated on a pressure guage 93 exposed to the pressure within the casing 81, at which time the valve 91 is opened, the valve 92 closed, and the water switch regulator functions through the thyratron control 88 and the solenoid actuated valve 86 in the same manner as described in connection with the supply air pressure regulator to maintain the pressure within the casing 81 substantially equal to the reference pressure isolated in the tank 89.

The preferred embodiment described for disclosing the invention is not to be taken as limiting since many changes and adaptations will be obvious to those skilled in the art without departing from the scope of the appended claims.

What is claimed as new is:

1. In the art of testing devices selectively sensitive to certain hydrostatic pressure signatures the method of producing a liquid pressure variable in accordance with a pressure-signature-bearing electric signal which comprises confining a body of liquid to provide a relatively small free surface, exposing the free surface to the pressure of a substantially constant volume air stream, feeding air to the air stream through a high resistance path, removing air from the stream through a low resistance path, and varying the resistance of the low resistance path as a linear function of the significant dimension of said electric signal, whereby the pressure to which the liquid surface is subjected varies with time as a direct function of said signal.

2. In a testing apparatus for pressure responsive devices, means providing a test tank adapted to hold a liquid in which pressure variations are to be produced and having an upwardly directed restricted neck and mouth portion, whereby a liquid filling the test tank to said neck portion has a free surface of relatively small area, a nozzle, means for feeding a gas through the nozzle at a substantially constant rate, means movable for varying the resistance to the escape of gas from the nozzle, whereby the back pressure in the gas within the nozzle is correspondingly varied, and means including a confined gas volume for exposing the free surface of the liquid to the back pressure in the gas within the nozzle.

3. Apparatus in accordance with claim 2 and wherein there are provided a chamber for containing the gas escaping from the nozzle, valve means for controlling the exhausting of gas from the chamber, and pressure sensitive means for regulating the valve means to maintain the pressure of the gas in the chamber at any preselected value.

4. Apparatus in accordance with claim 2 including electric motor means coupled in driving relation with said resistance varying movable means, means for generating an electric signal corresponding to the pressure variations to be produced, a first recorder, means for applying the electric signal to the motor means and to the first recorder, a second recorder, and pressure sensitive means responsive to the pressure variations produced in the test tank for energizing the second recorder, whereby the pressure variations actually produced may be compared with the pressure variations intended.

5. Apparatus for producing in a liquid variations in pressure in simulation of the operating conditions of underwater pressure responsive mechanisms comprising in combination a test chamber for containing a volume of liquid having a free surface, a constant volume-of-flow air jet, a flapper vane movable towards and away from the air jet for varying the resistance to the flow of air from the jet, whereby the back pressure upstream of the jet is correspondingly varied, a source of electric signals, an electromechanical device responsive to the electric signals and coupled to the flapper vane for moving the flapper vane so that the back pressure upstream of the jet is varied as a linear function of the electric signals, and means defining an air path between the free surface of the liquid in the test chamber, said defining means being so dimensioned that the volume of said air path is of a magnitude which does not reduce the speed of response below the speed needed to produce the desired frequency of variations.

6. Apparatus in accordance with claim 5 and wherein there are provided a closed chamber for containing the air issuing from the air jet, valve means for controlling the exhausting of gas from the chamber, and pressure sensitive means for regulating the valve means to maintain the pressure of the gas in the chamber at any preselected value, whereby operating conditions may be simulated corresponding to any water depth desired.

7. In apparatus of the character described means defining a channel for a stream of gas, means for feeding a gas through the channel at a substantially constant rate, an electromechanical device for varying the resistance to the escape of gas from the channel to thereby vary the back pressure in the stream of gas in accordance with its energization, a test tank having an upwardly directed mouth portion, means for confining a column of gas in fluid communication with the mouth portion of the test tank and with said channel, whereby when the test tank is filled to its mouth portion with a liquid the free surface of the liquid will be subjected to the back pressure in the stream of gas, electric signal producing means for energizing said device, pressure sensitive means arranged to be responsive to the pressure in the test tank, and means for making records of said electric signal and of the response of said pressure sensitive means.

References Cited in the file of this patent

UNITED STATES PATENTS

| | | |
|---|---|---|
| 257,754 | Pond | May 9, 1882 |
| 1,977,498 | Stoegemann | Oct. 16, 1934 |
| 2,542,905 | Cromer | Feb. 20, 1951 |
| 2,625,167 | Gess | Jan. 13, 1953 |

FOREIGN PATENTS

| | | |
|---|---|---|
| 51,056 | France (1st add. to 863,236) | Apr. 22, 1941 |
| 537,588 | Great Britain | June 27, 1941 |